XR 3,005,095

CROSS REFERENCE

SEARCH ROOM (2)

SIGNAL PRESENCE MONITOR FOR NOISE-TYPE SIGNALS

Filed Feb. 27, 1959 2 Sheets-Sheet 1

INVENTORS
HARRIS A. STOVER
ELMER C. THULIN
BY [signature]
ATTORNEY

3005095
OR IN 325/364

INVENTORS
HARRIS A. STOVER
ELMER C. THULIN
BY [signature]
ATTORNEY

United States Patent Office 3,005,095

Patented Oct. 17, 1961

3,005,095

SIGNAL PRESENCE MONITOR FOR NOISE-TYPE SIGNALS

Harris A. Stover and Elmer C. Thulin, Cedar Rapids, Iowa, assignors to Collins Radio Company, Cedar Rapids, Iowa, a corporation of Iowa Filed Feb. 27, 1959, Ser. No. 796,021

2 Claims. (Cl. 250—20)

This invention deals generally with a method of monitoring the signal strength input of a receiver and more particularly to a method of warning an operator when the signal being received is of a strength insufficient to properly operate the equipment.

In the operation of certain types of electronic equipment such as Doppler radar navigation systems, it becomes necessary to supply the operator with a warning that the equipment is malfunctioning or that the signal is of insufficient magnitude to operate the equipment in a reliable manner. Ordinarily, this may be accomplished by sampling the signal voltage and using it to operate a "warning flag" on the control unit or indicator. However, using this method it becomes very difficult for the flag warning circuit to differentiate between the signal and the noise when low level signals are being received. The foregoing is true even under conditions when the signal still possesses sufficient voltage for reliable operation of the receiver. One method of separating the signal from the noise incorporates a means, usually a selective transformer or filter, for narrowing the bandwidth of the system. But in the event that the signal has a broad frequency spectrum, as does Doppler radar navigation system signals, narrowing the bandwidth becomes impossible since the received signal consists of a noisy spectrum with a gaussian frequency distribution and may have a variance of up to one and a half kilocycles. The received signal may also be at a level of −150 dbw and as a result may be of a magnitude only slightly larger than the noise level of the receiver.

Systems previously used for operating the receiver when sufficient signal strength is present, such as the squelch system described in a patent to W. G. Klehforth, U.S. Patent Number 2,802,939, and assigned to the same assignee as this application, accomplish the above purpose by providing two channels for the received signal. A first channel consists of a low-pass filter and rectifier, and a second channel consists of a high-pass filter and rectifier. The low-pass filter passes both signal and noise while the high-pass filter passes only noise. In a comparison circuit, the signals from the low-pass channel and the high-pass channel are compared, and as long as the incoming signal plus noise from the low-pass channel exceeds the noise from the high-pass channel, sufficient signal is presumed to be present to reliably operate the receiver. However, this system requires extra components to be added to the receiver. These components include a high-pass filter, rectifier and low-pass filter and rectifier. The addition of these components will necessarily add additional expense and weight to the receiver. The system of this invention utilizes circuits most of which are already present and necessary in the receiver for other functions, therefore, eliminating the need for the added low-pass and high-pass filter channels. The elimination of unnecessary components within the receiver also permits it to be constructed in a much more compact and efficient manner.

Therefore, it is an object of this invention to provide a monitor that will warn an operator when the incoming signal is absent or too weak for reliable operation.

It is another object of this invention to utilize as much of the present receiver circuitry as is possible.

It is a further object of this invention to eliminate many of the filters and rectifiers required in previous circuits.

It is still another object to make the flag control voltage depend upon the signal voltage and the ratio of bandwidth only and not a function of background noise.

It is a still further object to provide a system that will give a reliable flag operation on a wide-band signal in a noise environment with a minimum of circuitry where ordinary methods would be unreliable.

The indicator on Doppler radar navigation systems is accurate only when a signal seeking discriminator such as the type used in Doppler radar systems has locked on the incoming signal. If the discriminator is in the process of seeking the signal, the indicator reading is unreliable. Therefore, it is a further object of this invention to warn the operator when the equipment is malfunctioning such as seeking or hunting for the frequency of the return signals.

This invention features a means for warning an operator when the operation of the equipment is malfunctioning or a received signal is too weak to operate his equipment in a reliable manner. It incorporates a comparison circuit which compares the noise and signal from a wide-band amplifier with noise and signal from a narrow-band amplifier in such a manner that when the signal is of insufficient strength to reliably operate the circuit, a warning device or flag is operated thus indicating to the operator that the system is malfunctioning or unreliable. The flag is likewise operated by the signal seeking discriminator when said discriminator is seeking the signal, since a portion of the voltage from the discriminator circuit is applied to the flag controlling circuit, which in turn causes the warning device to operate.

Further objects, features, and advantages of the invention will become apparent from the following description and claims when read in view of the accompanying drawings, in which:

This invention compares the signal plus noise power in a wide-band amplifier to the signal plus noise power in a narrow-band amplifier in the following manner:

$$S+N_1-K(S+N_2)=S(1-K)+(N_1-KN_2) \quad (1)$$

where S is the signal or intelligence desired to be received. $N_1$ is the noise in the wide-band amplifier. $N_2$ is the noise in the narrow-band amplifier and K is a constant that makes the noise in the respective channels cancel. In the ideal case, it is the ratio of the bandwidths when the filters have a rectangular frequency response and the noise has a flat frequency spectrum. From Equation 1 it can be seen that the quantity $(N_1-KN_2)$ can be made equal to zero by the proper selection of K such that $KN_2=N_1$. Under this selection of K the expression $S(1-K)$ is independent of the noise of the respective channels.

Figures 1, 2:
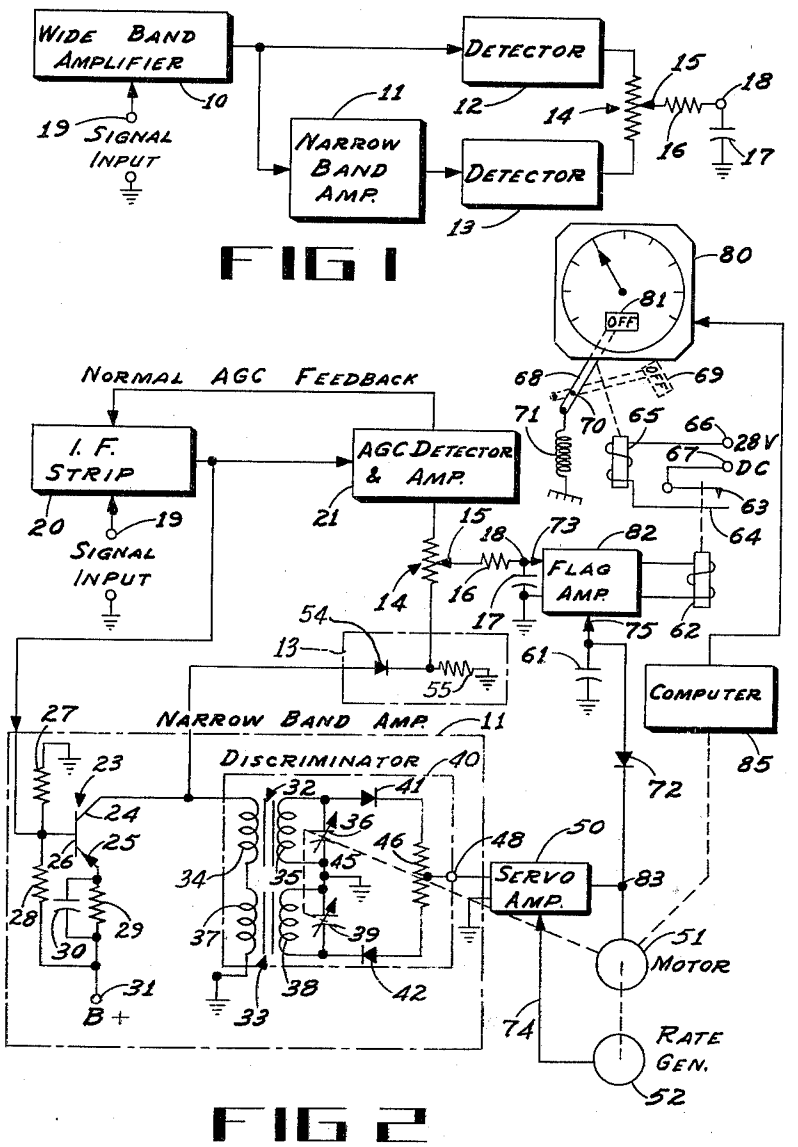
FIGURE 1 is a block diagram of one embodiment of this invention.
FIGURE 2 is a partial schematic of an embodiment of this invention.

Referring to FIGURE 1, the wide-band amplifier 10 has its output connected both to a detector 12 and to a narrow-band amplifier 11. The output of the narrow-band amplifier is connected to another detector 13. The output of both detectors 12 and 13 are connected to the respective ends of a balancing means such as a potentiometer 14. The arm 15 of the potentiometer is connected to a filtering circuit comprising a resistor 16 and a capacitor 17. The flag control voltage is taken between the junction 18 and ground.

In operation, an input signal S+ atmospheric and receiver noise N is applied to the input 19 of wide-band amplifier 10. Output voltage from the wide-band amplifier 10 is detected in detector 12. The output voltage from detector 12 being $S+N_1$ is applied to potentiometer 14. Voltage from the wideband amplifier is likewise applied to the narrow-band amplifier 11 and subsequently to detector 13. The output $S+N_2$ from detector 13 is also applied to the balancing potentiometer 14. Potentiometer 14 is the device that electrically represents the constant K in Equation 1 and is adjusted with the signal S absent until the noise power in the wide-band amplifier $N_1$ is balanced against the noise power in a narrow-band amplifier $N_2$ such that the output at junction 18 is at a null. This setting should not have to be readjusted from one location to the next since the noise level is of random magnitude and frequency distribution and, therefore, should affect both channels in a similar manner.

FIGURE 2 shows one embodiment of the invention wherein an intermediate frequency (IF) amplifier strip 20 serves as the wide-band amplifier, its output is applied to the automatic gain control detector (AGC) and amplifier 21. Both the IF amplifier 20 and AGC amplifier 21 are normal components of any receiver. The output of the AGC detector and amplifier 21 is applied to a balancing potentiometer 14. The output of the IF amplifier is likewise applied to the narrow-band amplifier which consists of a transistor amplifier 23 and a discriminator 40, both of which are also necessary for the proper function of the equipment aside from the flag warning circuit. The transistor amplifier 23 is of the usual type containing a base 26, emitter 25 and collector 24. Its base is biased by resistors 27 and 28. The emitter is biased by resistor 29 and by-passed by capacitor 30. A source of B+ is connected to both resistors 28 and 29 and serves as a source of power for the amplifier.

The discriminator 40 is of a standard type discriminator composed of band-pass filters 32 and 33. Filter 32 consists of a primary 34, secondary 35 and resonant capacitor 36. Filter 33 consists of a transformer having a primary 37, a secondary 38 and a resonant capacitor 39. Each of the filters 32 and 33 is tuned to a slightly different resonant frequency. The discriminator additionally includes diode 41 connected between the output of the filter and an adding circuit 46. Diode 42 is oppositely poled to diode 41 and connected between the output of filter 33 and adder 46. The remaining outputs from the filters 32 and 33 are connected to ground. The output from adder 46 is applied to the input of a servo amplifier 50. The output of the servo amplifier is applied to a motor 51 and rate feedback generator 52. Rate feedback is applied through wire 74 and also to the servo amplifier to provide a fixed amount of damping to the circuit. Capacitors 36 and 39 are mechanically coupled to the motor and generator.

As shown in FIGURE 2, detector 13 may consist of a diode 54 serially connected with a resistor 55 between the collector of transistor 23 and round. The output from the detector is connected from the junction of diode 54 and resistor 55 to the other side of balancing potentiometer 14. The malfunction voltage for operating the flag is taken from the output of the servo amplifier through a diode 72 which is applied to an input 75 of the flag warning amplifier 82. Capacitor 61 filters the voltage which is supplied to the input of the flag warning amplifier. The output of balancing potentiometer 14 is likewise applied to another input 73 of the flag warning amplifier. Resistor 16 and capacitor 17 furnish filtering for this voltage. The output of the flag warning amplifier 82 is applied to a relay 62 containing contacts 63 and 64 which operate a flag operating solenoid 65. Terminals 66 and 67 are connected from a source of power such as 28 v. D.C. The flag solenoid 65 is mechanically coupled to the flag arm 68 and operates the flag 69 about a pivot 70. The flag 69 is biased by spring 71 in the upward position. Indicator 80 contains a cutout 81 for displaying the flag when the solenoid 65 is operated, thus permitting the flag to warn the operator when the equipment is malfunctioning.

In operation, a signal is applied to the input terminals of the wide-band amplifier or intermediate frequency strip 20 from a receiver (not shown) and the signal output of the intermediate frequency strip 20 is applied both to the AGC detector and amplifier 21 and to the narrow-band amplifier 11. The detected signal from the AGC detector 21 is applied to balancing potentiometer 14. The signal from the intermediate frequency strip 20 is likewise applied to the narrow-band amplifier at the base of transistor 23. The amplifier output from collector 24 is applied to the signal seeking discriminator 40 at serially-connected primaries 34, 37 of filters 32, 33. The capacitors in cooperation with the inductors 35 and 38 form a tunable filter which can be adjusted by the external servo system comprising the servo amplifier 50, motor 51 and rate generator 52. Filters 32 and 33 are tuned to slightly different frequencies. Thus, as the signal from the narrow-band amplifier shifts in frequency, more voltage will appear across either the diode rectifier 41 or diode rectifier 42. This voltage unbalance causes a potential to appear at the junction 48. The magnitude of the potential will be dependent upon the amount that the frequency shifted, and its polarity will depend upon the direction it shifted. The impedance in the primary or secondary of the filter is dependent upon the bandpass characteristics of the filter. Since the primaries 34 and 37 of discriminator filters 32 and 33 are connected in series, both filters will act as a composite filter with a total bandpass as wide as the sum of their individual pass bands. Therefore, the discriminator acts in all respects as a narrow-band signal path since it is always tuned to the frequency of the incoming signal by the external servo system. The narrow-band amplifier detector comprising diode 54 and resistor 55 is connected across the serially-connected primaries of the discriminator input in order to utilize the composite filter feature of the discriminator input. Its output is applied to the remaining side of the balancing potentiometer 14. Potentiometer 14 is then adjusted until the noise $N_1$ from the AGC detector and amplifier equals the noist $N_2$ from the narrow-band amplifier 11 when the signal S is not present. Once the potentiometer 14 is set, it does not need to be readjusted at a new location.

The second feature of the signal monitor is a circuit providing for the operation of the warning flag when the discriminator is in the process of seeking the signal. If the signal should shift in frequency in a direction, for example, nearer to the resonant frequency of filter 32, a higher positive voltage will be developed at terminal 48 which will be applied to the servo amplifier 50 and to motor 51. Motor 51 will drive the capacitors 36 and 39 in a manner responsive to the discriminator output voltage such that the discriminator will be again recentered at the frequency of the incoming signal returning the voltage appearing at terminal 48 to a null. The angular position of the motor 51 is transferred to a computer 85 which in turn transfers data to the indicator 80. However, if voltage should appear at terminal 48, voltage will likewise appear at terminal 83, causing a D.C. bias voltage to appear at the input 75 of the flag amplifier. This bias voltage will block the flag amplifier 82 causing relay 62 to de-energize. Solenoid 65 will likewise de-energize permitting the flag to show in the indicator cutout 81.

Figure 3:
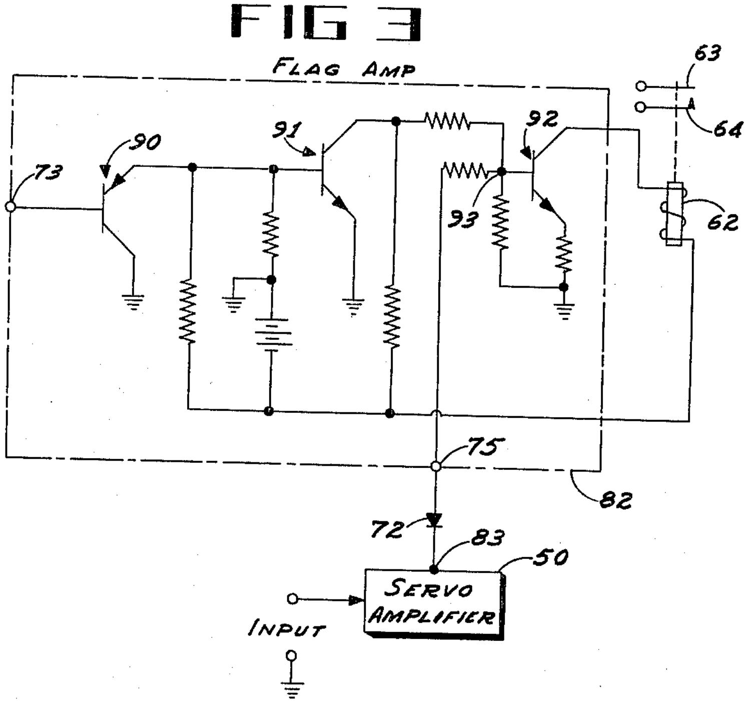
FIGURE 3 is a schematic of a flag control amplifier.

An amplifier that will accept both the signal from the balancing potentiometer 22 and cause relay 62 to operate and a voltage from 83 which causes 66 to de-energize is illustrated in FIGURE 3. Three transistors 90, 91 and 92 are connected as a direct current amplifier such that when a negative voltage for the balancing circuit 22 is applied to the base of transistor 90 it is subsequently amplified by transistor 91 and applied to the base of transistor 92 causing transistor 92 to conduct operating relay 62. However, if the servo amplifier should have an output at terminal 83, this output will be A.-C. voltage, being so converted by servo amplifier 50. A negative voltage, however, will still appear at 75 since the diode 72 causes rectification of the voltage. This negative voltage will be applied to the junction 93 and hence to the base of transistor 92 cutting said transistor off. Since this voltage is much larger than the voltage that would be present from the signal monitor, the transistor would remain cut off until the servo amplifier voltage is reduced to a null indicating that discriminator 40 is no longer seeking. When this occurs, the transistor will again return to a normal state of operation and the signal from the signal monitor will again re-energize the relay coil 62 permitting the flag solenoid 65 to remove the flag from view.

Therefore, if a signal of sufficient magnitude is received at the receiver, a voltage will be developed from the wide and narrow-band amplifiers which will appear at output 15 of balancing potentiometer 14. This voltage will be amplified in the flag amplifier 82 and operate relay 62 which energizes flag solenoid 65 through contacts 63 and 64. The operation of solenoid 65 will cause the flag 69 to retract indicating that there is sufficient signal to reliably operate the equipment. It should be remembered, however, that if the equipment is malfunctioning, such as the discriminator tuning, that a voltage from 83 will override the signal from the balancing potentiometer 14 and cause the flag to appear in window 81. When the signal voltage diminishes both through the wide-band amplifier and narrow-band amplifier, a signal strength will be reached when the signal is no longer strong enough to maintain the flag relay closed. Under these conditions, a signal is not reliable enough for proper operation of the equipment and the flag relay will open causing the flag 69 to be displayed at the window 81 of instrument 80. The flag will likewise be displayed if the voltage should fall for any other reason; namely, power failures or tube failures and the like, in the equipment.

It is obvious to one skilled in the art that any type of a well-known warning indicator, such as a light, may be substituted for the particular type illustrated herein.

It is also obvious to one skilled in the art that the voltage developed at the output of the flag warning array could be used to operate other equipment, such as a squelch circuit rather than a flag warning, if such were required.

Thus a monitor has been disclosed which provides a warning means that will visually present itself upon the malfunctioning of the equipment or upon the signal becoming too weak to properly operate the equipment (even if the useful signal level is less than the noise level).

Although this invention has been described with respect to a particular embodiment thereof, it is not to be so limited as changes and modifications may be made therein which are within the full intended scope of the invention as defined by the appended claims.

We claim:

1. A monitoring means, comprising: a wide-band signal path adapted to receive a signal S; a first detector connected to said wide-band signal path and having an output of $S+N_1$, where $N_1$ is the noise from the output of said first detector; a narrow-band signal path adapted to receive said signal S, said narrow-band signal path including a tunable frequency discriminator; a second detector connected to said narrow-band signal path, said second detector having an output of $S+N_2$, where $N_2$ is the noise from the output of said second detector; adjustable adding means connected to the outputs of said detectors for balancing the noise $N_1$ against the noise $N_2$ so that when said signal S is absent the output voltage of said adding means is at a null; indicating means; and amplifying means having first and second inputs and an output, the first input of said amplifying means being connected to the output of said adding means, the second input of said amplifying means being connected to the output of said discriminator, and the output of said amplifying means being connected to said indicating means, whereby voltage derived from the output of said adding means causes said indicating means to indicate the presence of said signal S, and whereby voltage derived from the output of said discriminator will block said amplifying means and cause said indicating means to indicate a malfunction.

2. A signal presence monitoring device, comprising: a wide-band signal path adapted to receive a signal S; a first detector connected to the output of said wide-band signal path and having a signal $S+N_1$ from its output where $N_1$ is the noise power from said first detector; a narrow-band signal path adapted to receive said signal S, said narrow-band signal path including a frequency selective discriminator; a second detector connected to said narrow-band signal path and having an output signal of $S+N_2$ where $N_2$ is the noise power from said second detector, said second detector including in combination a unilateral conductive device in series with a resistor with said combination connected across the input of said discriminator and with the output of said second detector being derived from the junction of said unilateral conductive device and said resistor; and adjustable adding means receiving the signals from said first and second detectors, said noise powers $N_1$ and $N_2$ being balanced by adjustment of said adjustable adding means until the output signal from said adjustable adding means is at a null when said signal S is absent so that a voltage appears at the output of said adjustable adding means only when said signal S is present in said wide-band and narrow-band signal paths.

References Cited in the file of this patent

UNITED STATES PATENTS

| | | |
|---|---|---|
| 2,477,564 | Carnahan | Aug. 24, 1948 |
| 2,533,543 | Young | Dec. 12, 1950 |